(12) United States Patent
Choi et al.

(10) Patent No.: US 9,336,242 B2
(45) Date of Patent: May 10, 2016

(54) MOBILE TERMINAL AND DISPLAYING METHOD THEREOF

(75) Inventors: Wonsik Choi, Seoul (KR); Beobki Chung, Seoul (KR); Hyeongjin Kim, Seoul (KR); Minsup Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 862 days.

(21) Appl. No.: 13/188,099

(22) Filed: Jul. 21, 2011

(65) Prior Publication Data

US 2012/0094720 A1 Apr. 19, 2012

(30) Foreign Application Priority Data

Oct. 14, 2010 (KR) ........................ 10-2010-0100321

(51) Int. Cl.
*H04M 1/00* (2006.01)
*G06F 17/30* (2006.01)

(52) U.S. Cl.
CPC ............................ *G06F 17/30274* (2013.01)

(58) Field of Classification Search
USPC .............................................. 455/550.1, 566
See application file for complete search history.

(56) References Cited

U.S. PATENT DOCUMENTS

| | | | | |
|---|---|---|---|---|
| 5,940,308 | A * | 8/1999 | Ishikawa | G06T 15/00 703/8 |
| 6,515,704 | B1 * | 2/2003 | Sato | H04N 1/00442 348/333.05 |
| 2003/0095198 | A1 | 5/2003 | Onuki et al. | |
| 2003/0217057 | A1 * | 11/2003 | Kuroiwa | G06F 17/30905 |
| 2005/0041035 | A1 | 2/2005 | Nagatomo et al. | |
| 2005/0226530 | A1 * | 10/2005 | Murayama | G06T 11/60 382/276 |
| 2006/0224937 | A1 * | 10/2006 | Sudoh | G06F 3/048 715/201 |
| 2007/0008321 | A1 * | 1/2007 | Gallagher | G06F 17/30265 345/473 |
| 2007/0189736 | A1 * | 8/2007 | Satoh | G06F 3/0227 386/230 |
| 2007/0266343 | A1 | 11/2007 | Isoda | |
| 2008/0021862 | A1 * | 1/2008 | Ohta | G06F 21/83 |
| 2008/0034325 | A1 | 2/2008 | Ording | |
| 2010/0088645 | A1 * | 4/2010 | Zhang | G06F 3/0482 715/838 |
| 2011/0050726 | A1 * | 3/2011 | Suehiro | H04N 1/00132 345/635 |

\* cited by examiner

*Primary Examiner* — Christopher M Brandt
*Assistant Examiner* — Matthew Genack
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a controller configured to create a first set of thumbnail images for a first set of images among a plurality of images; and a display configured to display at least a portion of the first set of thumbnail images generated by the controller.

22 Claims, 14 Drawing Sheets

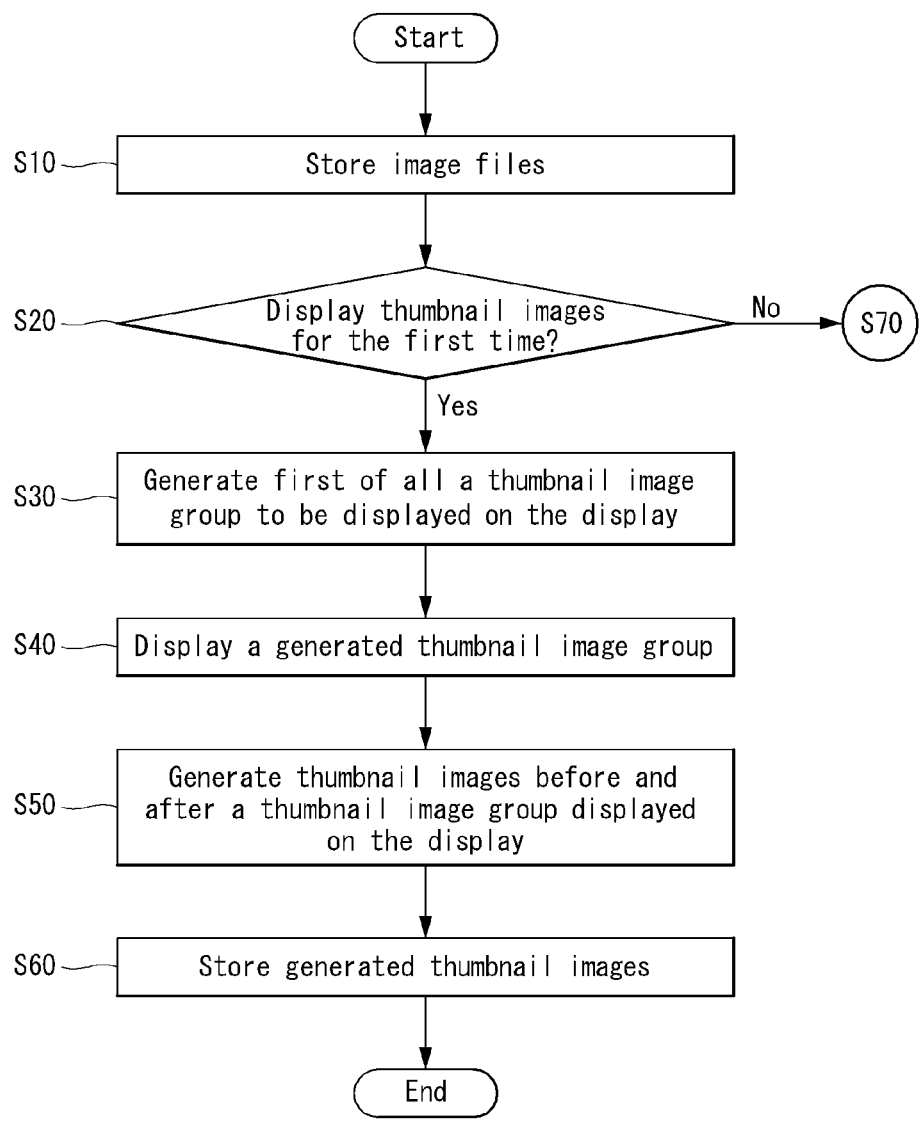

FIG. 7
a b
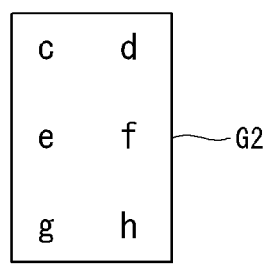
c d
e f — G2
g h
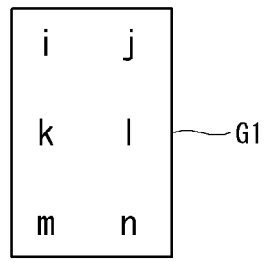
i j
k l — G1
m n
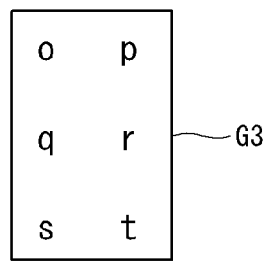
o p
q r — G3
s t
u v

MOBILE TERMINAL AND DISPLAYING METHOD THEREOF

This application claims the benefit of Korean Patent Application No. 10-2010-0100321 filed on 14 Oct., 2010 which are hereby incorporated by reference.

BACKGROUND OF THE INVENTION

1. Field of the Invention

The present invention relates to a mobile terminal and a displaying method thereof. More specifically, the present invention relates to a mobile terminal and a displaying method thereof which enhance display speed of thumbnail images by displaying the thumbnail images of group-wise categorization in units of a group.

2. Description of the Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals provide more complex and various functions.

SUMMARY OF THE INVENTION

The present invention relates to a mobile terminal and a displaying method thereof. More specifically, the present invention relates to a mobile terminal and a displaying method thereof which enhance display speed of thumbnail images by displaying the thumbnail images of group-wise categorization in units of a group.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 3 is a flow chart illustrating a procedure of operating a mobile terminal according to one embodiment of the present invention;

FIGS. 7 and 8 illustrate examples of grouping thumbnail images;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
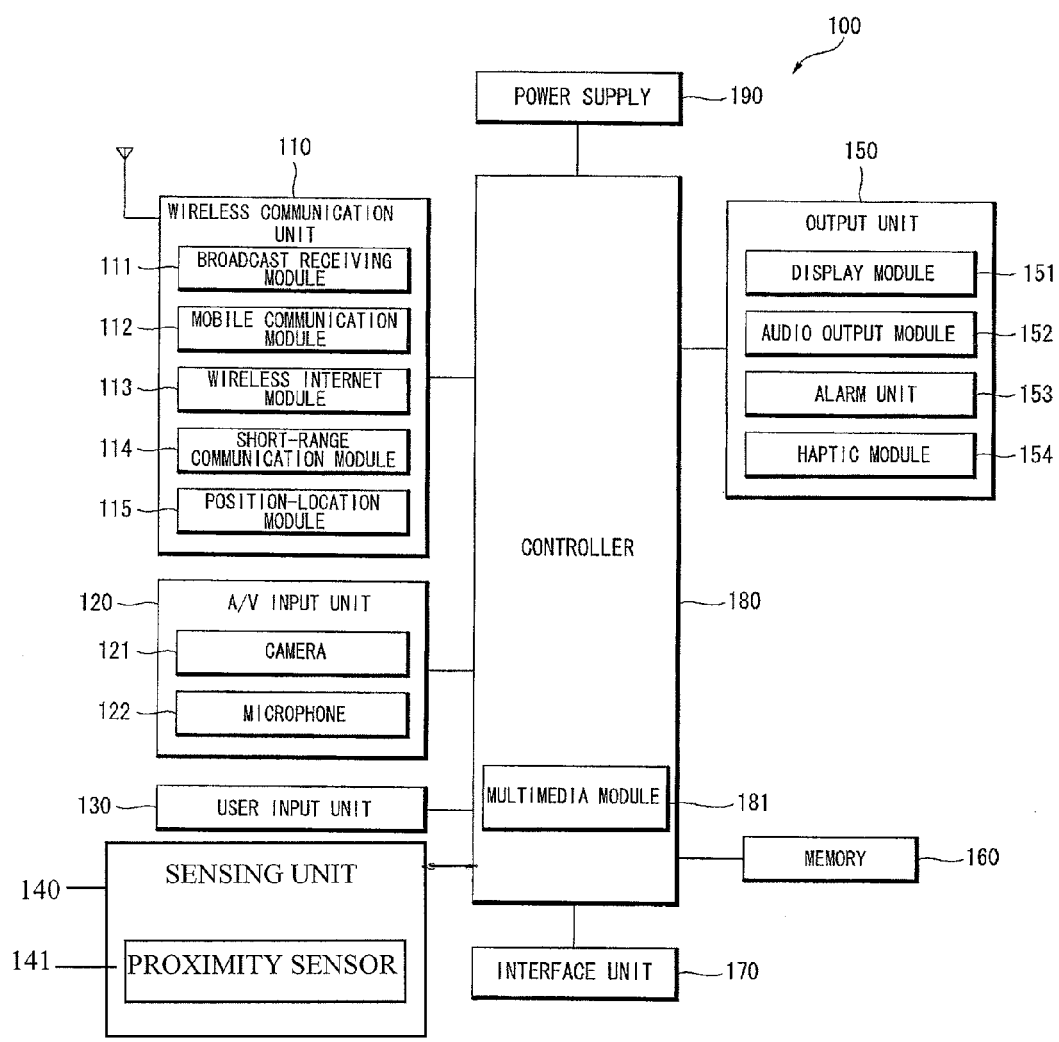
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
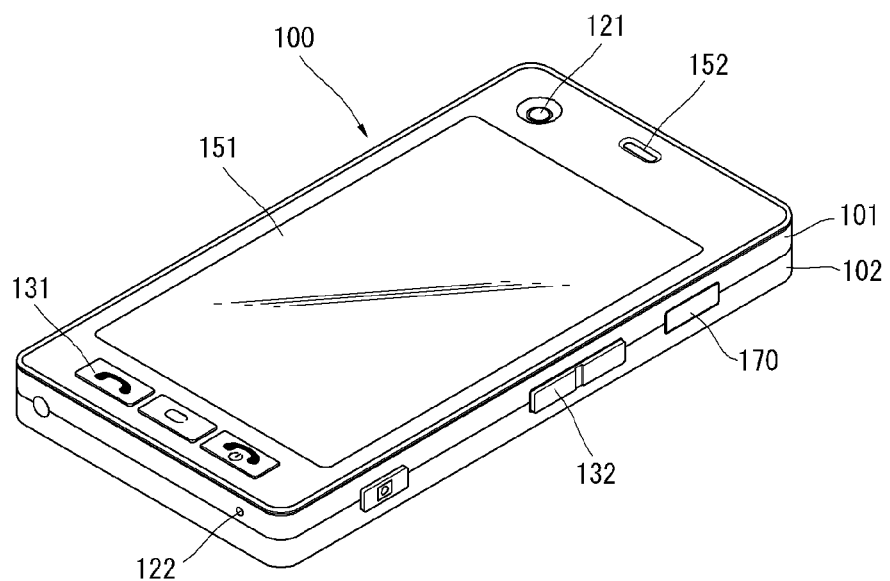
FIG. 2A is a front perspective view of the mobile terminal according to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
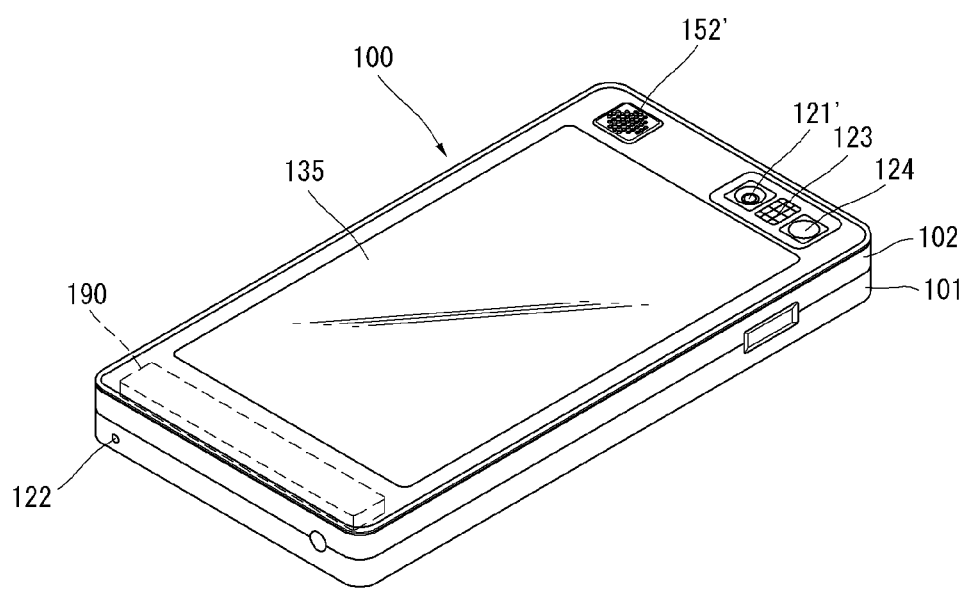
FIG. 2B is a rear perspective view of the mobile terminal according to an embodiment of the present invention.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The minor 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 4:
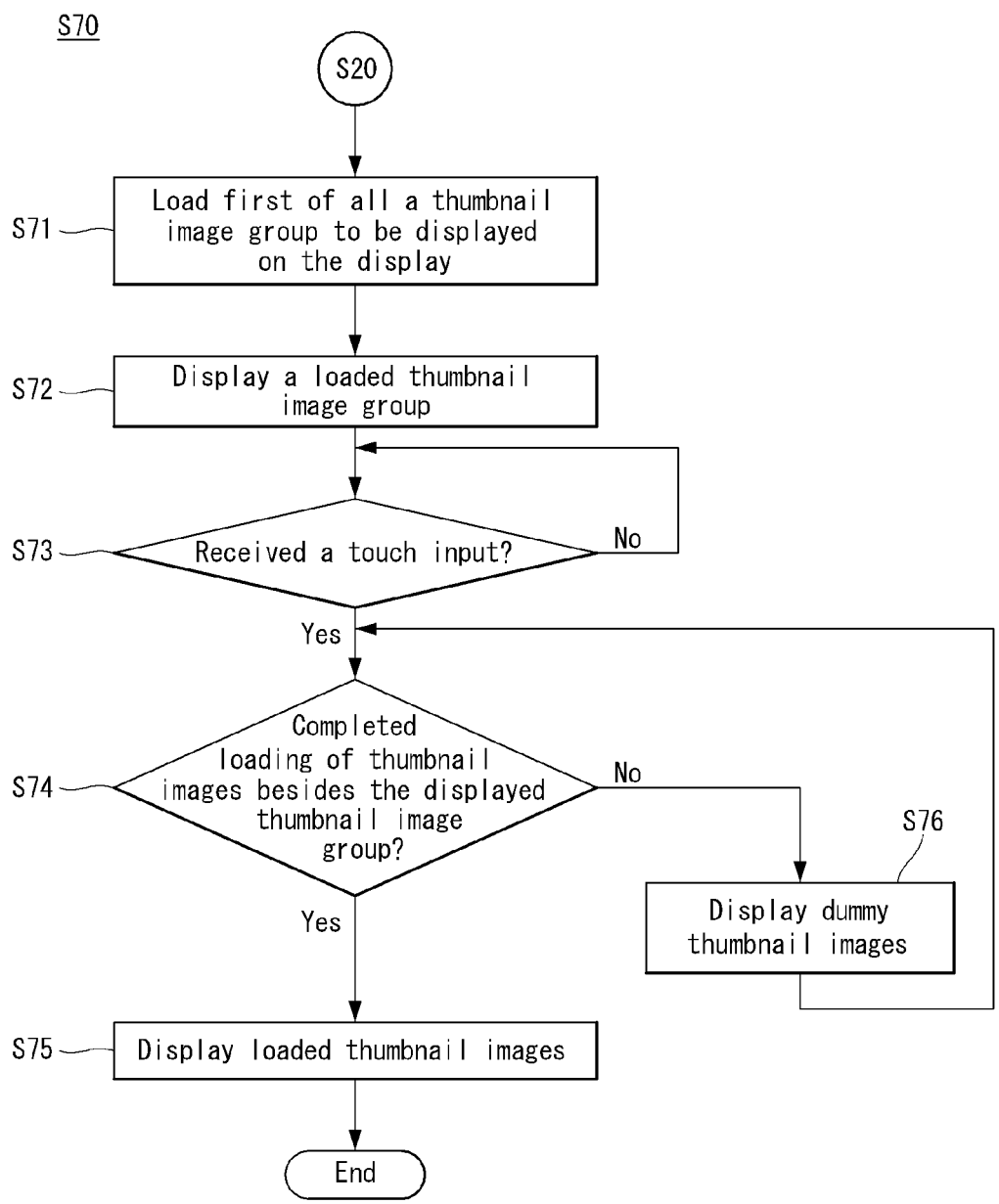
FIG. 4 is a flow chart illustrating a procedure of operating a mobile terminal where thumbnail images of FIG. 3 are not shown for the initial display.

FIG. 3 is a flow chart illustrating a procedure of operating a mobile terminal according to one embodiment of the present invention; and FIG. 4 is a flow chart illustrating a procedure of operation of a mobile terminal where thumbnail images of FIG. 3 are not shown for the initial display. FIG. 1 will also be referred to in this description.

As shown in the figures, the controller 180 stores image files in step S10. Image files can be obtained in various ways. For example, image files can be obtained from other devices. In other words, the image files can be obtained by connecting to another device such as a computer. Also, image files can be obtained by connecting to an external device such as a different mobile terminal through wired or wireless communication. For example, image files can be obtained from a different device which is connected to a communication network. In addition, image files can be generated by the camera 121 installed at the mobile terminal 100 and can be stored in the memory 160. For example, if the user takes a picture by using the camera 121, the captured image can be stored in the memory 160. Image files can also be generated by various applications installed in the mobile terminal 100 and can be stored in the memory 160. For example, the user can activate a drawing application and generate a picture and then store the picture in the memory 160.

The controller 180 then determines whether to show thumbnail images at the initial display (S20). A thumbnail image can be a simplified image of the original image file. Since a thumbnail image has a smaller capacity and size than the original image, a large number of thumbnail images can be displayed in a relatively short period of time. Therefore, a method of displaying the original images after thumbnail images are displayed first on the display 151 and the user selects a particular thumbnail image is widely used for the mobile terminal 100 and various electronic devices.

To display thumbnail images, thumbnail images corresponding to the original image files are prepared first. A thumbnail image can be generated at various points of time, one of which can be the time when the thumbnail image is to be displayed for the first time. Description for displaying thumbnail images other than for the first time will be given in more detail at the corresponding part of this document.

If thumbnail images are shown at the initial display (Yes in S20), the controller 180 generates a group of thumbnail images to be displayed on the display 151 (S30) and displays the generated group of thumbnail images (S40).

The controller 180 can generate thumbnail images sequentially based on predetermined criteria. For example, the controller 180 can first generate thumbnail images to be displayed on the display 151 at the moment of displaying thumbnail images. At this time, a group of thumbnail images to be displayed on the display 151 can be dealt with as a first group while those thumbnail images which can be displayed by a touch motion of the user because of their adjacency to the first group can be dealt with as a second and a third group. If thumbnail images are grouped in this way, the controller 180 can generate thumbnail images belonging to the first group first and display the generated thumbnail images.

By generating and displaying part of thumbnail images first rather than all of the thumbnail images, the user can get a feeling that thumbnail images are displayed quickly, thereby enhancing a perceived display speed.

After generating a particular group of thumbnail images first, the controller 180 generates thumbnail images before and after (e.g., adjacent) the group of thumbnail images displayed on the display 151 (S50).

By generating and displaying thumbnail images to be displayed currently on the display 151 and then generating those thumbnail images adjacent thereto, resources of the mobile terminal 100 can be utilized efficiently and at the same time, a perceived display speed can be enhanced. The controller 180 also stores generated thumbnail images (S60).

As shown in FIG. 4, if thumbnail images are not shown at the initial display (S70 and No in S20), the controller 180 loads a group of thumbnail images to be displayed on the display from the memory 160 first (S71) and displays a loaded group of thumbnail images (S72).

Further, if thumbnail images are not shown at the initial display, it indicates that thumbnail images have been displayed before. Therefore, previously generated thumbnail images might have been stored in the memory 160. The controller 180 can load the stored thumbnail images. It should be noted, however, that the controller 180 can load a group of thumbnail images to be displayed on the display 151 first and display the group of thumbnail images on the display 151.

The controller 180 then determines whether a touch input has been received (S73). A touch input can be the one intended to substitute different thumbnail images for currently displayed thumbnail images. For example, the touch input can be the one intended to display thumbnail images before or after currently displayed thumbnail images. If a touch input is received, display of thumbnail images displayed on the display 151 can be changed according thereto.

If a touch input is received (Yes in S73), the controller 180 determines whether loading of thumbnail images besides the group of thumbnail images displayed is completed (S74). Thumbnail images can be loaded sequentially, starting from the one to be displayed currently on the display 151. Therefore, the controller 180 can determine whether loading of thumbnail images corresponding to the direction of a touch input motion has been completed.

If loading of thumbnail images is completed (Yes in S74), the controller 180 displays loaded thumbnail images (S75); if not (No in S74), the controller 180 displays dummy thumbnail images (S76).

A certain amount of time may be needed for loading thumbnail images depending on the performance of the mobile terminal 100. If the user performs a touch motion within a predetermined period of time, however, loading of thumbnail images corresponding to the part which should be displayed from the touch motion may not be fully completed. If new thumbnail images are to be displayed due to a touch input of the user while loading is not completed, the controller

180 can display dummy thumbnail images on the part where thumbnail images are to be displayed. The dummy thumbnail images can be in the form of a rectangular box displayed where actual thumbnail images are to be displayed.

Figure 5:
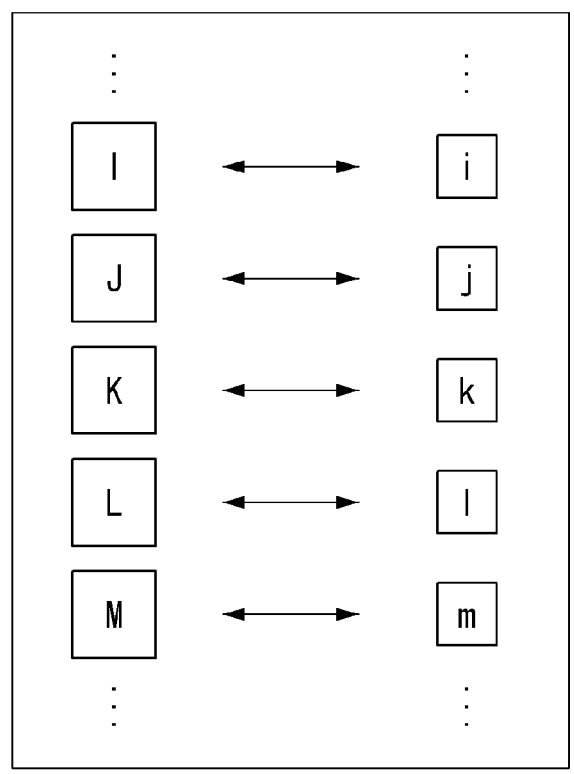
FIG. 5 illustrates a correspondence relationship between image files and thumbnail images.

FIG. 5 illustrates a correspondence relationship between image files and thumbnail images. As shown in the figure, image files and thumbnail images can have a correspondence relationship between them. Each image file has been represented by an English capital letter within a rectangular box; and each thumbnail image by an English small letter within a rectangular box. The representation above is the same in the following except for the case indicated otherwise.

Image files and thumbnail images can be stored in the memory 160 of the mobile terminal 100. Also, each image file can have a corresponding thumbnail image. However, each thumbnail image associated with the corresponding image file is not necessarily stored in the memory 160. For example, if an image file M is newly created, a thumbnail image m corresponding to the image file M may not have been generated yet. Therefore, the controller 180, if thumbnail images are to be displayed anyhow, determines whether thumbnail images corresponding to image files exist; if thumbnail images do not exist, the thumbnail images can be newly generated. As described above, generation of thumbnail images can be the moment the thumbnail images are to be displayed for the first time. Moreover, as described in the corresponding part of this document, thumbnail images can also be generated if the load of the mobile terminal 100 is a predetermined value or below, which is when the mobile terminal 100 is in a dim mode, sleep mode, and so on.

Figure 6:
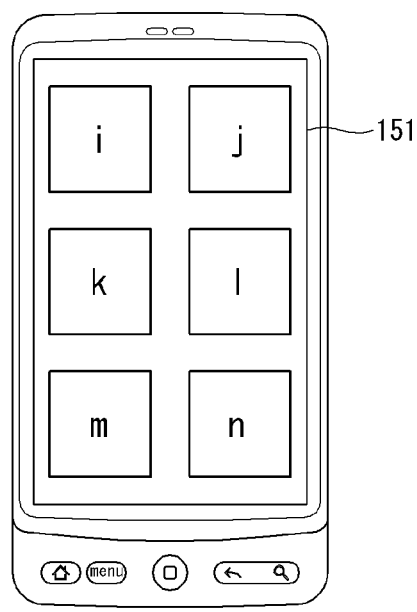
FIG. 6 illustrates a screen of the mobile terminal of FIG. 3 where thumbnail images are displayed.

Next, FIG. 6 illustrates a screen of the mobile terminal 100 where thumbnail images are displayed. As shown in the figure, the mobile terminal 100 according to one embodiment of the present invention can receive a selection signal from the user or display thumbnail images on the display according to a control signal of the controller 180. For example, thumbnail images i, j, k, l, m, and n can be displayed. As described above, the controller 180, first of all, can load and display those thumbnail images to be currently displayed on the display 151 from among a plurality of thumbnail images.

Figure 8:
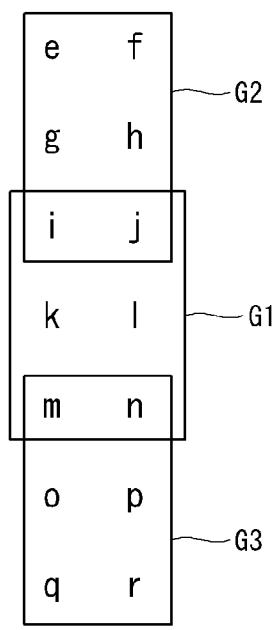

FIGS. 7 and 8 illustrate examples of grouping thumbnail images. As shown in the figures, the controller 180 of the mobile terminal 100 according to one embodiment of the present invention can group thumbnail images in various ways.

As shown in FIG. 7, if a plurality of thumbnail images exist, thumbnail images of i to n can be grouped as a first thumbnail group G1; c to h as a second thumbnail group G2; and o to t as a third thumbnail group G3. At this time, the first thumbnail image group G1 can be the group which should be displayed on the display 151 at the current moment; and the second and the third thumbnail image group G2, G3 can be thumbnail images positioned before and after the first thumbnail image group, respectively. Although the first, the second, and the third thumbnail image group G1, G2, G3 are shown in the figure, it should be understood that more thumbnail image groups can exist with respect to the first thumbnail image group G1.

The controller 180 can load the first thumbnail image group G1 in the first place. Therefore, the first thumbnail image group G1 can be displayed first on the display. Also, by loading the second and the third thumbnail image group G2, G3 after loading the first thumbnail image group, a prompt response can be made when the displayed thumbnail images are to be changed.

The first, the second, and the third thumbnail image groups G1, G2, G3 are not limited to the thumbnail images shown. In other words, depending on the thumbnail images displayed on the display 151, display of thumbnail images can be changed continuously. For example, if the thumbnail images displayed on the display 151 are g, h, i, j, k, and l, the second thumbnail images G2 can range from a to f; and the third thumbnail images G3 can range from m to r.

The thumbnail images included in the first thumbnail image group G1 are not limited to the thumbnail images actually displayed on the display 151. In other words, although it was described that the first thumbnail image group G1 are those displayed on the display 151, it is possible that only part of the first thumbnail image group G1 are actually displayed on the display 151 and the rest thereof are those thumbnail images loaded to prepare for a case when the screen is changed.

As shown in FIG. 8, the second and the third thumbnail image groups G2 and G3 can be set to overlap with the first thumbnail image group G1. For example, the first and the second thumbnail image groups G1 and G2 can have overlapping thumbnail images i, j; and the first and the third thumbnail image groups G1 and G3 can have overlapping thumbnail images in, n.

Figure 9:
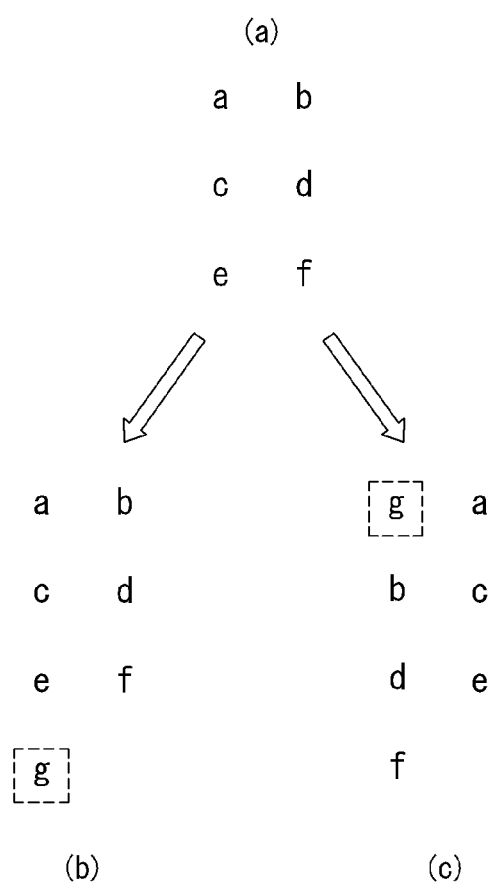
FIG. 9 illustrates a case where a new thumbnail image is added.

FIG. 9 illustrates a case where a new thumbnail image is added. As shown in the figure, thumbnail images newly added in the mobile terminal 100 according to one embodiment of the present invention can be arranged by ascending order or descending order.

As shown in FIG. 9(a), thumbnail images a to f can be stored in the memory 160.

As shown in FIG. 9(b), a new thumbnail image g can be added to the existing thumbnail images a to f. At this time, the newly added thumbnail image g can be arranged by ascending order in terms of image file generation time. That is to say, the newly added thumbnail image can be added to the last of the existing thumbnail image database DB. If the newly added thumbnail image g is added in such a way to append to the last of the existing thumbnail images, it becomes unnecessary to newly configure the thumbnail image database. Therefore, a faster arrangement can be made possible.

As shown in FIG. 9(c), a new thumbnail image g can be added to the existing thumbnail images a to f. At this time, the newly added thumbnail image g can be arranged by descending order in terms of image file generation time. That is to say, the newly added thumbnail image can be added to the front of the existing thumbnail image database DB. If the newly added thumbnail image g is added in such a way to precede the first of the existing thumbnail images, it becomes necessary to newly configure the thumbnail image database. Therefore, a certain amount of time may be needed to newly configure the database. However, since the newly added thumbnail image is displayed first, the user can more clearly recognize the change.

Figure 10:
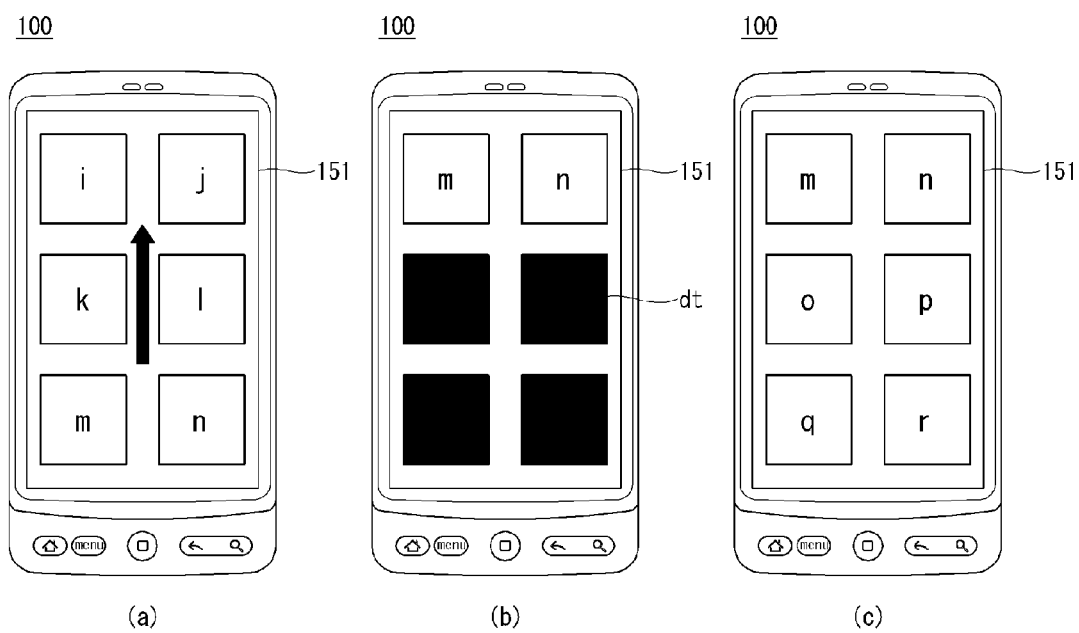
FIG. 10 illustrates a procedure of displaying dummy thumbnail images of FIG. 4.

FIG. 10 illustrates a procedure of displaying dummy thumbnail images of FIG. 4. As shown in the figure, the mobile terminal 100 according to one embodiment of the present invention can display dummy thumbnail images on the part where loading of thumbnail images are not completed.

As shown in FIG. 10(a), thumbnail images i to n may have been displayed already on the display 151. At this time, the user can perform a drag touch or a flicking touch motion from a lower part toward an upper part in order to change the screen.

As shown in FIG. 10(b), the controller 180 can change the display of thumbnail images by scrolling the display 151 along the direction of the touch motion. However, due to the performance limit of the mobile terminal 100, loading of thumbnail images o to r to be displayed next may not be completed. In this case, the controller 180 can display dummy thumbnail images dt. The dummy thumbnail images dt can have the size about that of a thumbnail image and can be in the rectangular shape of a single color. A dummy thumbnail image of a simple single color dt can be generated and displayed faster than when thumbnail images corresponding to image files are loaded. Therefore, although loading of thumbnail images have not been completed yet, the user can know that thumbnail images to be displayed at the corresponding positions exist.

As shown in FIG. 10(*c*), if loading of thumbnail images are completed after displaying dummy thumbnail images, thumbnail images can be displayed instead of the dummy thumbnail images.

Figure 11:
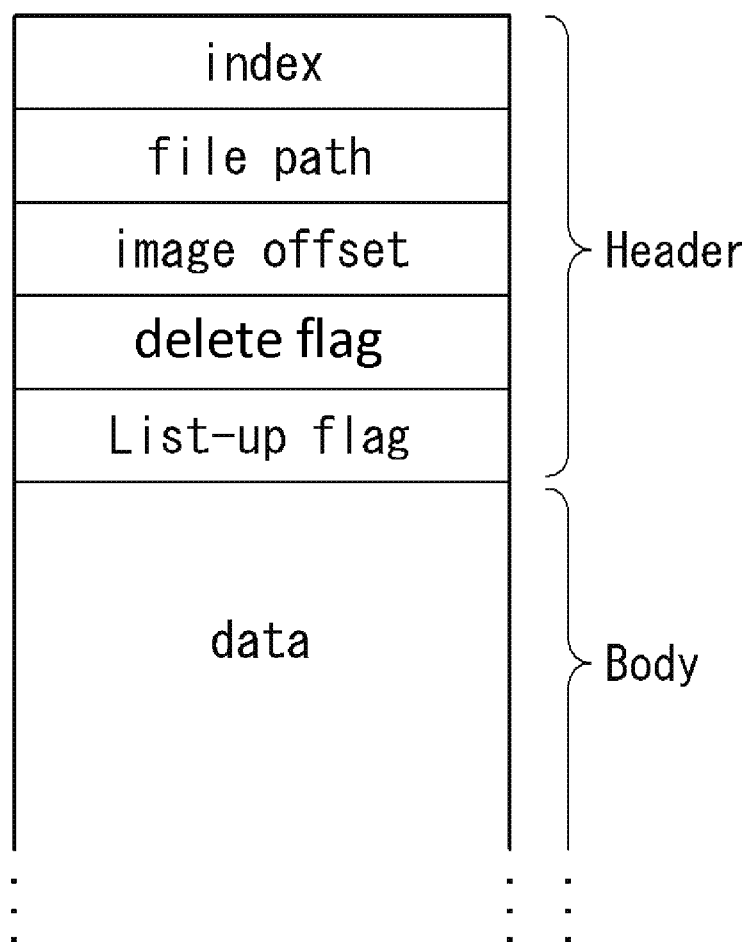
FIG. 11 illustrates a data structure of a thumbnail image according to one embodiment of the present invention.

FIG. 11 illustrates a data structure of a thumbnail image according to one embodiment of the present invention. As shown in the figure, a thumbnail image according to one embodiment of the present invention can include a header including particular information and a body including information of the thumbnail image.

A header can have information related to a thumbnail image. For example, the header can include an index, a file path, an image offset, a dirty flag, and a list-up flag.

The index can be a unique identifier for each thumbnail image. In other words, the index can be the name of a particular thumbnail image. The controller (180 of FIG. 1) can search the index for a particular thumbnail image and display the thumbnail image.

The file path can include position information of an image file corresponding to each thumbnail image. If a particular thumbnail image is selected, an image file corresponding to the selected thumbnail image can be displayed on the display 151. The controller (180 of FIG. 1), with reference to the file path included in the thumbnail image, can find and display the corresponding image file.

The image offset can represent which order each thumbnail image corresponds to among a particular group.

The delete flag can represent whether a thumbnail image has been selected to be deleted by the user or the controller 180. The user can enter an input to delete a thumbnail image displayed on the display 151. The input of the user indicating to delete a thumbnail image can eventually function as an input to delete an image file corresponding to the thumbnail image. If an input to delete a particular thumbnail image is received from the user, the controller 180 can deactivate the display of the corresponding thumbnail image from the display 151. In other words, the above has the same effect of making the corresponding thumbnail image disappear from the display 151. At the same time, the controller 180 can activate the delete flag. However, at this moment, the controller 180 may not delete the image file corresponding to the thumbnail image. Since an image file has a relatively large file size, the operation of deleting the image file can take a predetermined period of time to perform. Therefore, during deletion of an image file, the mobile terminal 100 slows down temporarily or the user may get a false feeling that the mobile terminal 100 has stopped operating. The mobile terminal 100 can only activate the delete flag without deleting the corresponding image file at the moment a thumbnail image is deactivated for display but delete the image file corresponding to the thumbnail image whose delete flag has been activated from the memory 160 at a particular point of time. At this time, the particular point of time when the image file is deleted can be the moment when the mobile terminal 100 enters a dim mode or a sleep mode. Since an image file is not deleted while the user actually uses the mobile terminal 100, a perceived performance of the user can be enhanced.

The list-up flag can represent whether a thumbnail image corresponding to a particular image file exist. For example, if the list-up flag is deactivated, it can be interpreted that a thumbnail image corresponding to a particular image file does not exist; if activated, it can be interpreted that a thumbnail image corresponding to a particular image file exists. The controller 180, if a thumbnail image is generated, can activate the list-up flag of the thumbnail image.

Figure 12:
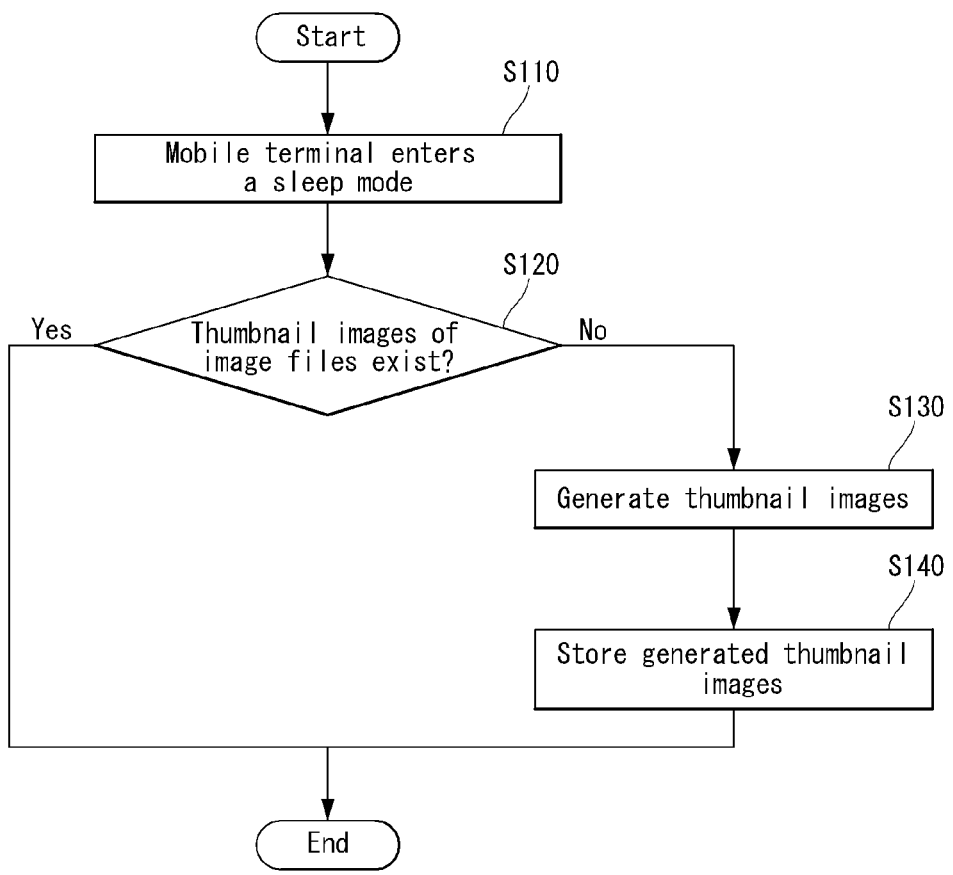
FIG. 12 is a flow chart illustrating a procedure of operation of a mobile terminal according to one embodiment of the present invention.

Next, FIG. 12 is a flow chart illustrating a procedure of operating a mobile terminal according to one embodiment of the present invention. As shown in the figure, the mobile terminal 100 according to one embodiment of the present invention can generate and store thumbnail images corresponding to image files when the load applied to the mobile terminal 100 is relatively low. By carrying out the operation of generating thumbnail images when the user does not operate the mobile terminal 100, a perceived speed of the user can be enhanced.

The mobile terminal 100 can enter a sleep mode (S110). The sleep mode can correspond to a mode where the mobile terminal 100 enters into a waiting state if an input for the mobile terminal 100 is not received for a predetermined period of time or by the user's operation.

If the mobile terminal 100 enters the sleep mode, the controller 180 determines whether thumbnail images corresponding to image files exist (S120).

Whether thumbnail images corresponding to image files exist can be determined by checking the list-up flag of the image header of thumbnail images. In other words, if the list-up flag is deactivated, the controller 180 can determine that a thumbnail image associated with the corresponding image file does not exist. Because of the existence of the list-up flag, existence of thumbnail images can be scanned relatively fast.

If a thumbnail image of an image file does not exist (No in S120), the controller 180 generates thumbnail images (S130) and stores generated thumbnail images (S140).

Since the steps of generating and storing thumbnail images is performed while the mobile terminal 100 is in the sleep mode, thumbnail images can be automatically generated and stored while the user is unaware of the operation. Therefore, a perceived speed of the user can be enhanced compared to when thumbnail images are generated and stored while the user uses the mobile terminal 100.

Figure 13:
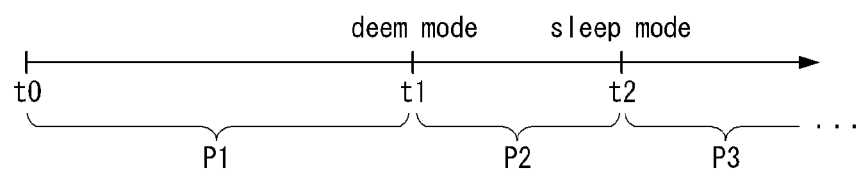
FIG. 13 illustrates the operation timing of the mobile terminal of FIG. 12.

FIG. 13 illustrates the operation timing of the mobile terminal of FIG. 12. As shown in the figure, the mobile terminal 100 according to one embodiment of the present invention can operate in any one state among a first state P1 which is the state before the dim mode, a second state P2 after the dim mode and before the sleep mode, and a third state P3 after the sleep mode.

The first state can be the state where the user is operating the mobile terminal 100. The mobile terminal 100 according to one embodiment of the present invention can minimize the operation related to the manipulation of thumbnail images and image files while in the first state P1.

The second state P2 can be the state where the user does not operate the mobile terminal 100 for a predetermined period of time. The dim mode can be the state where the backlight of the display 151 is turned off right before the mobile terminal enters the sleep mode where the display 151 is completely turned off. The mobile terminal 100 according to one embodiment of the present invention can perform the operation related to the manipulation of thumbnail images and image files when in the second state P2.

The third state P3 can be the state where the user does not operate the mobile terminal 100 for a considerable period of time. The mobile terminal 100 according to one embodiment of the present invention can perform the operation related to the manipulation of thumbnail images and image files when in the third state P3. By performing the operation related to the manipulation of thumbnail images and image files when the mobile terminal 100 is in the second and the third state P2 and P3, a perceived speed of the user can be enhanced.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a memory storing a plurality of images, the plurality of images divided into a plurality of sets of images, the plurality of images not having a plurality of corresponding thumbnail images; and
a controller configured to:
receive a command to display a plurality of thumbnail images corresponding to the plurality of images;
create a first set of thumbnail images corresponding to a first set of the plurality of images when the first set of thumbnail images are first to be displayed before creating thumbnail images for remaining images of the plurality of images;
display at least a portion of the created first set of thumbnail images;
store at least one of the first, second and third thumbnail images into the memory when the load of the controller is lower than a predetermined value before displaying the at least one of the first, second and third thumbnail images;
load the first set of thumbnail images when the first set of thumbnail images are not first to be displayed from the memory; and
display the loaded first set of thumbnail images,
wherein the second and third set of thumbnail images include at least one thumbnail image which is not displayed when the first set of the thumbnail images is displayed.

2. The mobile terminal of claim 1, wherein the second and third sets of thumbnail images include thumbnail images overlapping with some of the thumbnail images of the first set of thumbnail images.

3. The mobile terminal of claim 1, wherein the memory is further configured to store the plurality of images before the controller generates the first set of thumbnail images.

4. The mobile terminal of claim 1, wherein the memory is further configured to store the created first, second and third sets of thumbnail images.

5. The mobile terminal of claim 1, wherein the controller is further configured to create a new thumbnail image corresponding to a new image of the plurality of images, and to add the created new thumbnail image to the first set of the thumbnail images at a beginning or at an end of the first set of thumbnail images.

6. The mobile terminal of claim 1, wherein the memory is further configured to store header data corresponding to the plurality of thumbnail images, and
wherein the header data includes at least any one from an index about a thumbnail image corresponding to the header data, positions of the plurality of images corresponding to the thumbnail images, a position of the thumbnail image within the set group, information about whether the thumbnail image has been deleted, and information about whether the thumbnail image has been generated.

7. The mobile terminal of claim 1, wherein the controller is further configured to enter the mobile terminal into a low power mode, and to create the first, second and third set of thumbnail images only during the low power mode.

8. The mobile terminal of claim 1, wherein the controller is further configured to receive a deletion signal requesting at least one of the first set of thumbnail images be deleted, to stop displaying the selected at least one of the first set of thumbnail images, and to delete an image corresponding to the selected at least one of the first set of thumbnail images only after the mobile terminal enters a dim mode or a sleep mode.

9. The mobile terminal of claim 1, wherein each of the first, second and third sets of thumbnail images include six thumbnail images.

10. The mobile terminal of claim 9, wherein each of the first, second and third sets of thumbnail images are self-contained sets of thumbnail images and do not include a thumbnail image from another set.

11. The mobile terminal of claim 9, wherein the first set of thumbnail images include two thumbnail images from the second set of thumbnail images and two thumbnail images from the third set of thumbnail images.

12. A method of controlling a mobile terminal, the method comprising:
    storing a plurality of images in a memory of the mobile terminal, the plurality of images divided into a plurality of sets of images, the plurality of images not having a plurality of corresponding thumbnail images;
    receiving a command to display a plurality of thumbnail images corresponding to the plurality of images;
    creating, via a controller of the mobile terminal, a first set of thumbnail images corresponding to a first set of the plurality of images when the first set of thumbnail images are first to be displayed before creating thumbnail images of the remaining images of the plurality of images;
    displaying, via a display of the mobile terminal, at least a portion of the created first set of thumbnail images;
    creating a second set and a third set of thumbnail images adjacent to the first set of thumbnail images in a specified arrangement list of the plurality of thumbnail images;
    storing at least one of the first, second and third thumbnail images into the memory when the load of the controller is lower than a predetermined value before displaying the at least one of the first, second and third thumbnail images;
    loading the first set of thumbnail images when the first set of thumbnail images are not first to be displayed from the memory; and
    displaying the loaded first set of thumbnail images,
    wherein the second and third set of thumbnail images include at least one thumbnail image which is not displayed when the first set of the thumbnail images is displayed.

13. The method of claim 12, wherein the second and third sets of thumbnail images include thumbnail images overlapping with some of the thumbnail images of the first set of thumbnail images.

14. The method of claim 12, further comprising:
    storing, in the memory of the mobile terminal, the plurality of images before the generating step generates the first set of thumbnail images.

15. The method of claim 12, further comprising:
    storing, in the memory of the mobile terminal, the created first, second and third sets of thumbnail images.

16. The method of claim 12, wherein the creating step further comprises creating a new thumbnail image corresponding to a new image of the plurality of images, and adding the created new thumbnail image to the first set of the thumbnail images at a beginning or at an end of the first set of thumbnail images.

17. The method of claim 12, further comprising:
    storing, in the memory of the mobile terminal, header data corresponding to the plurality of thumbnail images,
    wherein the header data includes at least any one from an index about a thumbnail image corresponding to the header data, positions of the plurality of images corresponding to the thumbnail images, a position of the thumbnail image within the set group, information about whether the thumbnail image has been deleted, and information about whether the thumbnail image has been generated.

18. The method of claim 12, further comprising:
    entering the mobile terminal into a low power mode; and
    creating the first, second and third set of thumbnail images only during the low power mode.

19. The method of claim 12, further comprising:
    receiving a deletion signal requesting at least one of the first set of thumbnail images be deleted;
    stop displaying the selected at least one of the first set of thumbnail images; and
    deleting an image corresponding to the selected at least one of the first set of thumbnail images only after the mobile terminal enters a dim mode or a sleep mode.

20. The method of claim 12, wherein each of the first, second and third sets of thumbnail images include six thumbnail images.

21. The method of claim 20, wherein each of the first, second and third sets of thumbnail images are self-contained sets of thumbnail images and do not include a thumbnail image from another set.

22. The method of claim 20, wherein the first set of thumbnail images include two thumbnail images from the second set of thumbnail images and two thumbnail images from the third set of thumbnail images.

* * * * *